United States Patent [19]
Vernon et al.

[11] 3,907,478
[45] Sept. 23, 1975

[54] PRODUCTION OF POLYMER FIBERS

[75] Inventors: Brian J. Vernon, Timperley; Wladyslaw H. Skoroszewski, Manchester, both of England

[73] Assignee: Shell Oil Company, Houston, Tex.

[22] Filed: Jan. 20, 1972

[21] Appl. No.: 219,407

Related U.S. Application Data

[62] Division of Ser. No. 814,768, April 9, 1969, Pat. No. 3,672,013.

[30] Foreign Application Priority Data
Apr. 10, 1968 United Kingdom............... 17237/68

[52] U.S. Cl.................................. 425/367; 425/327
[51] Int. Cl.²............................................ B29D 7/22
[58] Field of Search ........... 425/325, 327, 328, 365, 425/366, 367, 374, 471; 264/DIG. 8

[56] References Cited
UNITED STATES PATENTS

| | | | |
|---|---|---|---|
| 2,728,950 | 1/1956 | Annesser | 264/DIG. 47 |
| 3,146,492 | 9/1964 | Lemelson | 425/327 |
| 3,348,264 | 10/1967 | Rice et al | 425/327 X |
| 3,500,627 | 3/1970 | Kim | 264/DIG. 47 |
| 3,515,325 | 6/1970 | Kalwaites | 264/DIG. 47 |

*Primary Examiner*—Robert D. Baldwin
*Attorney, Agent, or Firm*—Martin S. Baer; Howard W. Haworth

[57] ABSTRACT

Synthetic fibers, such as polypropylene fibers, are manufactured in a form in which the fibers are of regular dimensions and substantially free from whiskery appendant fibrils, by a controlled fibrillation method which comprises impressing in a web of the polymer composition at a temperature above its crystalline melting point a plurality of grooves disposed in close but spaced-apart relationship to the longitudinal direction of the web by passing the web at said temperature between two rollers having non-yielding surfaces, e.g. steel rollers, at least one of which bears closely spaced, parallel surface ridges each having inwardly directed sides leading to peaks which are rounded off to a small radius, the sides of adjacent ridges forming troughs, chilling the grooved web, and subjecting the chilled web to a fibrillation treatment including stretching said web to orient the polymer.

1 Claim, 5 Drawing Figures

PRODUCTION OF POLYMER FIBERS

This is a division of application Ser. No. 814,768, filed Apr. 9, 1969, now U.S. Pat. No. 3,672,013, issued June 27, 1972.

The present invention is concerned with the manufacture of synthetic fibers, including staple fibers and yarns and with the machinery for the manufacture from molecularly-orientable organic polymers, particularly polyolefins and olefin copolymers, for example, high density polyethylene and polypropylene.

It is known that molecularly-orientable organic polymers in the form of films which have been uniaxially oriented by stretching can undergo fibrillating fracture (herein referred to as fibrillation) along cleavage lines running in the direction of orientation but spaced apart in a generally random fashion in the direction at right angles to the direction of orientation. Fibrillation can be induced by subjecting the uniaxially oriented film to mechanical treatment, for example, brushing or air blast treatment; such treatment is referred to herein as "fibrillation treatment". It is also known to slit or score film in the direction of orientation prior to said mechanical treatment with a view to promoting fibrillation and of reducing the degree of randomness in the spacing of said cleavage lines. It has also been proposed, in U.S. Pat. No. 2,728,950 to Annesser, issued in 1956, to score unstretched orientable plastic film, illustrated by a 97:3 vinylidene chlorideacrylonitrile polymer, by passing it between a heated, grooved scoring roller---having grooves separated by sharp ridges which score or cut the film--and a resilient backing roll.

Although the general concept of fibrillation has been known for many years, considerable effort has been devoted, and continues to be devoted, by those in the art to the many problems which arise when applying this concept to the manufacture of "fine fibers," i.e. fibers of extremely small cross-section, for example, 5 to 90 denier fibers, from molecularly-orientable organic polymers. In order to compete with fibers produced by the conventional "spinneret method," the manufacture of fine fibers by fibrillation must be capable of yielding fibers of acceptable and consistent quality at comparable or lower cost and by reliable and practical techniques.

It has now been found, in accordance with the present invention, that fine fibers can be manufactured from molecularlyorientable organic polymers, for example, polyolefins and olefin copolymers (the term "polymer" including a polymer composition) by the controlled fibrillation of a film thereof which has been profiled in cross-section in the manner described hereinafter. The profiling is such as to provide longitudinally extending portions of the film, which are the precursors of the required fibers, spaced apart by longitudinally extending portions of lesser thickness, which are the precursors of predetermined cleavage paths along which fibrillation will occur. The term "controlled fibrillation" is used to indicate a fibrillating fracture (the description "fibrillating fracture" including what can be referred to as "spontaneous splitting") along such predetermined cleavage paths to give sharply defined fibers substantially free from "whiskery" appendant fibrils. The term "controlled fibrillation" is used herein to provide a contrast with random fibrillation which occurs in a longitudinal direction but not along predetermined cleavage paths; in random fibrillation, such appendant fibrils tend to be formed even when the film is scored or cut prior to fibrillation.

The present invention is of particular interest for the manufacture of fine polypropylene fibers, for which appreciable potential outlets have become apparent in recent years in the textile industry, for example, for carpet manufacture, but it is not limited thereto; for example, the nylons and high density polyethylene are alternative molecularlyorientable organic polymers from which fine fibers can be manufactured by the process of the present invention.

According to one aspect of the present invention, a process for the manufacture of synthetic fibers comprises bringing a sheet-like mass of a molecularly-orientable organic polymer composition at a temperature above the crystalline melting point of the polymer into pressure contact with a profiling element to form a profiled polymer web having a plurality of longitudinal grooves disposed in close but spaced-apart relationship in at least one surface thereof, chilling the profiled web during and/or after contact with said profiling element to a temperature below the crystalline melting point of the polymer and stretching the chilled, profiled web to effect orientation thereof, the chilled web being subjected during and/or after stretching to conditions resulting in a controlled fibrillation thereof to form fibers. Said profiling element has a plurality of closely spaced, parallel surface ridges each having inwardly directed sides leading to a peak, the sides of adjacent ridges form troughs, having, for example, concavely-shaped bottoms.

Usually the sheet-like mass of polymer will be of web form, but one mode of practicing the invention comprises the simultaneous formation of the required web form during the profiling operation. The temperature of the polymer immediately prior to being brought into pressure contact with the profiling element can be between the crystalline melting point of the polymer and 150°C above it, for example, between about 150° and 300°C for polypropylene. While the contact pressure referred to should be less than that which would cause incision of the web during profiling, the pressure should be sufficient to ensure that the grooved portions of the profiled web are significantly thinner than the "humps" between the grooves thereof. The humps are formed by polymer flowing into and filling the troughs between adjacent ridges of the profiling element; the contact pressure should be adequate to ensure that this takes place. To illustrate the order of pressure required to effect the desired contact with the profiling element it can be stated that good results have been obtained with contact pressures in excess of about 500 pounds per square inch, the required pressure being readily determined by trial on the basis that the contact pressure should be sufficient to form a profiled web capable of undergoing controlled fibrillation.

The present invention also includes the resulting synthetic fibers and staple fibers, yarns, and textile goods, ropes and other cordage made therefrom.

According to a further aspect of the present invention, machinery suitable for use in the manufacture of synthetic fibers comprises a web-profiling unit and means for uniaxially stretching a profiled polymer web from said profiling unit and for subjecting the stretched web to a fibrillation treatment, said web-profiling unit comprising a profiling element having a plurality of closely-spaced, parallel surface ridges, each having inwardly directed sides leading to a peak and the sides of adjacent ridges forming troughs, for example, having concavely-shaped bottoms, and means for effecting pressure contact between a moving sheet-like mass of polymer at a temperature above its crystalline melting point and said profiling element. Preferably said profiling element comprises a ridged roller or the like and said means for effecting pressure contact comprises a further roller or the like, the rollers or the like being brought together to form a nip through which the sheet-like mass of polymer can be passed, and driving means for rotating the ridged roller or the like. In a preferred arrangement, a ridged roller is mounted for rotation about a fixed axis and means, for example, a hydraulic or pneumatic mechanism, are provided for biasing the other roller towards the ridged roller to effect the required pressure contact.

The present invention also includes the above-described web profiling unit per se; such a unit can be used in combination with conventional in-line stretching equipment and, if necessary, with any known or suitable fibrillating equipment.

According to a further aspect of the present invention, a web-profiling unit comprises a pair of cooperating rotatable rollers or the like having non-yielding surfaces, at least one of said rollers or the like being adapted to be driven and having a plurality of closely-spaced, parallel, surface ridges each having inwardly directed sides leading to a peak and the sides of adjacent ridges forming troughs, for example, having concavely-shaped bottoms, and means for biasing said rollers or the like towards one another to form a nip.

While the process of the present invention is preferably carried out using as the profiling element a ridged roller, for example, a drum and the web is pressed against the ridged roller by a plain, i.e. unridged, roller (herein referred to as a "backing roller"), one may also employ other forms of profiling elements, for example, an endless belt having the requisite surface ridges. The ridged roller or other profiling element must have a hard, non-yielding surface, for example, of steel; the backing roller or other backing element also has a non-yielding surface in view of the pressures involved in the profiling operation and the need for accurate profiling of the polymer web. In a convenient arrangement a ridged roller, which is rotated by suitable driving means, for example, an electric motor, is disposed alongside a backing roller, provision being made for accurately positioning one roller with respect to the other to ensure that their axes are truly parallel during operation of the process. Such positioning can be achieved by means of a hydraulic or pneumatic mechanism which also provides the required contact pressure on the hot web during profiling.

The web to be profiled can be formed, for example, by conventional slot-die extrusion as a first step in the process of the present invention, the disposition of the extrusion orifice with respect to the ridged roller being, for example, such that the hot, extruded web flows downwardly into the nip formed between the ridged roller and the backing roller, although it could also flow downwardly onto either roller. In this way the extruded web, which at the temperatures involved has insufficient strength to withstand even the low tensions involved in pulling a web over rolls or off a reel, can be handled without difficulty. It will be appreciated that preheating a preformed web of polymer to above its crystalline melting point prior to contacting the ridged roller would be a difficult operation in practice; carrying out the present process in this way, although not necessarily excluded, is preferably avoided. At the temperature of the web when it contacts the ridged roller the selected groove profile can be accurately reproduced in the impressed web, provided the necessary contact pressure is applied to the web as indicated above. Accurate profiling is important from the point of view of achieving uniformity in the resulting fine fibers. As soon as the required grooves have been formed in the web, the resulting groove profile can be "set" and the web rendered handleable by the chilling operation. Consequently, rapid chilling of the hot web to below its crystalline melting point is preferably completed as soon as possible after the requisite grooves have been formed therein. The required chilling can be obtained, for example, by the circulation of a cooling heat-transfer liquid, for example, water, through the ridged roller and/or through the backing roller. Both rollers preferably have provision for the circulation of heat-transfer fluid therethrough so that the surfaces of the rollers can be maintained at any desired temperature during operation of the process. This opens up the possibility of effecting a differential surface cooling of the profiled web which, in some cases, may be used to impart self-crimping properties to the resulting fibers.

The web can be profiled, i.e. impressed with said grooves, on either one or both of its surfaces. In the latter case two ridged rollers (or other profiling elements) can be used, each of which is provided with the necessary surface ridges of identical pitch and usually also identical profiles. For example, the hot web can be passed through the nip formed between two ridged rollers which are accurately positioned with respect to the one another so that the peaks of the respective ridges impress the web in exactly opposed positions. However, to avoid unnecessary complication it is preferable to form grooves in only one surface of the web unless fibers of particular crosssection which can only be obtained by grooving both surfaces are required. Usually fibers of suitable cross-section to meet end-use requirements are readily obtainable by grooving only one surface of the web.

The web can be of any convenient width and in general the width of the web will be subject only to any limitations imposed thereon by the extrusion process by means of which it is produced. It is a particular advantage of the present invention that webs of quite large widths, for example, up to 1 yard can be converted into a large number of fibers, for example, up to 12,000, depending upon the web width and the denier of the fiber. In this way a larger fiber output can be achieved from a single manufacturing line comprising only one web-profiling unit. The hot web fed to the profiling element can have a thickness of between 25 and 200 microns, although webs of other thickness are not excluded.

In the process of the present invention, the chilled, profiled web leaving the nip is stretched, for example, tenfold, using suitable stretching equipment known to those skilled in the art, with the result that the polymer comprised therein is oriented and the cross-sectional area of the web is reduced correspondingly. Stretching can be carried out using, for example, a pair of Godet roll sets with a hot air oven disposed between them through which the web under tension passes. The second Godet roll set is rotated faster than the first to an extent which provides the desired degree of draw, i.e. the stretch ratio. Typical ratios which can be employed for polypropylene are between 5:1 and 12:1 or more; the hot air oven can be operated at a temperature of the order of 140° to 150°C.

As a result of the profile of the stretched web a controlled fibrillation thereof will occur under suitable conditions. In fact, it is a particular advantage of the present invention that such conditions in many instances can be provided by the mechanical handling of the web during the stretching operation. In many instances, for example, with polypropylene webs, the profiled web undergoes a spontaneous breakdown into filaments during passage through the second Godet unit; in fact some splitting can occur in the hot air oven. If necessary, however, the conditions under which controlled fibrillation of the chilled web takes place are provided by subjecting the web, after stretching, to fibrillation treatment, which can be carried out in any known or suitable manner. For example, twisting can be utilized, using a conventional heavy duty twisting machine, such as a sisal type twisting machine. preferably, however, such fibrillation treatment when it is required is effected by means of an air blast treatment effected by passing the stretched web through an elongated passage of restricted cross-section through which a current of air flows at a high velocity in the direction of movement of the web. For example, good results have been obtained by feeding the stretched web through an aspirator, for example, the device commonly known as a "waste collector", operated at about 80 pounds per square inch (gauge) pressure. In this way one can avoid the need for reeling-up between stretching and fibrillation treatment since the air blast fibrillator can operate effectively at throughput speeds equal to those at which the stretched film leaves the second Godet roll set; such speeds can be, for example, 200 to 400 feet or more per minute.

The stretched web, upon fibrillation, yields a large plurality of fine fibers, each of which is formed by a "hump" in the stretched profiled web.

Although the description herein refers mainly to continuous fibers and yarns formed therefrom, it will be understood that the present invention can also be used for the manufacture of staple fibers, for example, by chopping into short lengths the continuous fibers formed in the fibrillation stage; these staple fibers can then be processed by conventional textile handling techniques.

If desired, the sheet-like mass of polymer fed to the profiling unit can comprise a plurality of hot webs which are united during the profiling operation. For example, two such webs can be formed by slit-die extrusion from polymers of different characteristics, they may differ, for example, in molecular weight or chemical nature. The resulting hot webs can be fed through the nip between the ridged roller and the backing roller to become united into a single bi-component web and simultaneously profiled in accordance with the present invention. Alternatively, said individual webs can be brought together to form a hot, bi-component web prior to contacting the ridged roller, for example, by employing a multiple orifice die or by bringing separate melts of the two polymers together in the die-head in a region located just before the extrusion orifice.

Preferably the ridges of the profiling element, for example, a ridged roller, should have the sort of profile that can best be described as sharp peaks, but it is to be understood that the word "sharp" is intended to include the case in which the peak is rounded off to a small radius or in which the tip of the peak includes a small flat portion. The profile of the ridges should be such that the hot web is grooved, i.e. impressed or embossed, to give a cross-sectional profile comprising a large plurality of spaced-apart "humps," each of suitable "fiber-forming" profile, joined together by narrow "troughs" having a thickness which may be of the order of about 1/10 to 1/20 or even less of that of the original web. The humps constitute the precursors of the ultimate fibers and the troughs constitute the precursors of the predetermined cleavage paths along which the stretched web will split during the controlled fibrillation thereof. The ultimate fine fibers can have a denier of 5 up to 90; such fibers have excellent handle and appearance, and a good tenacity, for example 7 grams per denier.

In the case of a ridged roller, the ridges on the periphery of the ridged roller can have a pitch lying within the range 0.003 to 0.050 inches and the depth of the troughs between adjacent ridges can lie within the range 0.002 to 0.02 inches. Preferably the ridges extend without interruption round the periphery of the roller, but it is also possible for each ridge to be divided lengthwise into two or more sections by plain, i.e. un-ridged, portions of the roller surface which are staggered with respect to one another across the width of the rollers. The latter arrangement may have advantages when, for example, it is desired to form a yarn for twisting into twine for use as such or in the manufacture of rope or other cordage, since the individual fibers in the resulting yarn will not be completely separated from one another, thereby increasing the strength of the twine.

The present invention will now be described with reference to the accompanying drawings in which.

Figure 1:
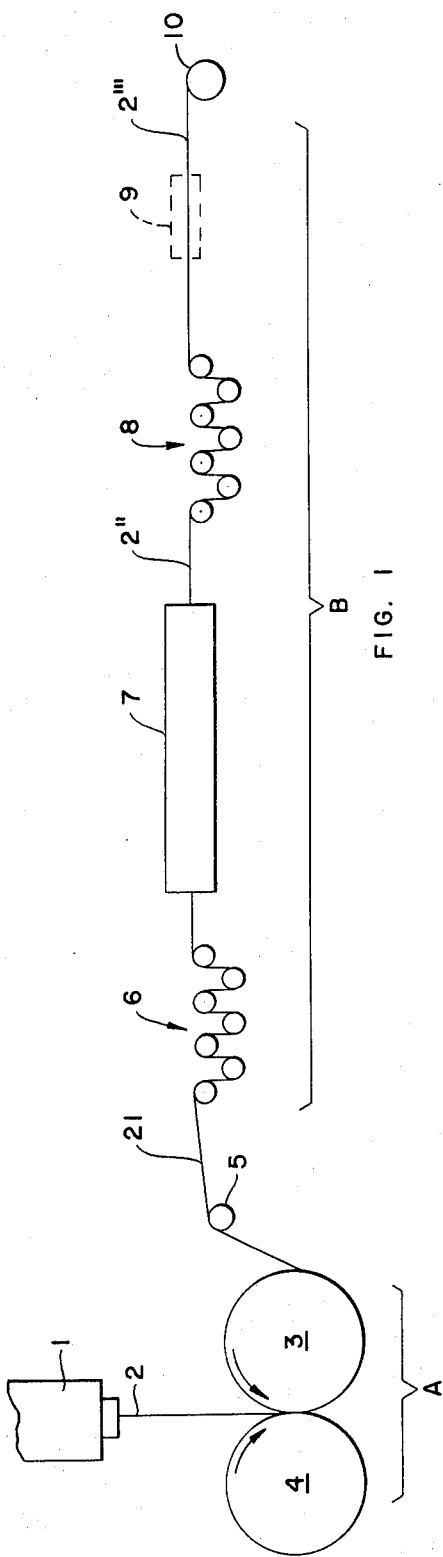
FIG. 1 shows schematically the general arrangement of equipment suitable for use in carrying out the present invention.

Referring to FIG. 1, the process of the present invention is carried out in two successive stages, namely web-profiling (A), and stretching and fibrillation (B). In the first stage (A), a slot die extruder 1 provides a web 2 of molecularly-orientable organic polymer composition at a temperature above its crystalline melting point, which is fed between the nip formed between a roller 3 having closely-spaced, parallel surface ridges and a smooth-surfaced backing roller 4. Both rollers 3 and 4 are of steel so as to provide non-yielding surfaces for impressing the desired grooves into the surface of the web 2 without cutting through the web, the latter being avoided by careful positioning of backing roller 4 with respect to ridged roller 3. The resulting grooved web 2' passes over an idler roller 5 to the first roll of a standard Godet unit 6 which in operation provides the necessary tension in the web to pull it through the nip between rollers 3 and 4. The web 2' is pulled from the first Godet unit 6 through a standard heating oven 7 by a second Godet unit 8 which runs at a higher speed than unit 6 so as to stretch the web 2' into its drawn Form 2''. Such stretching effects molecular orientation of the web 2' and also results in an appreciable drawdown of its cross-section to an extent depending on the draw-down ratio employed; suprisingly, in most instances controlled fibrillation of the drawn-down web 2'' occurs during the mechanical handling which occurs during its passing through the second Godet unit 8; in fact such fibrillation can start within the oven 7 in which stretching is taking place. In this way a spontaneous and complete division of the web into individual fibers, each of drawn-down cross-section corresponding to that of the "humps" of the impressed web, occurs. However, if a complete division is not achieved in this way the stretched web 2'' is passed through an aspirator shown in broken lines at 9 in which fibrillation takes place or is completed. In either case the resulting yarn 2''' of individual fibers is reeled-up on the spool 10.

Figure 2:
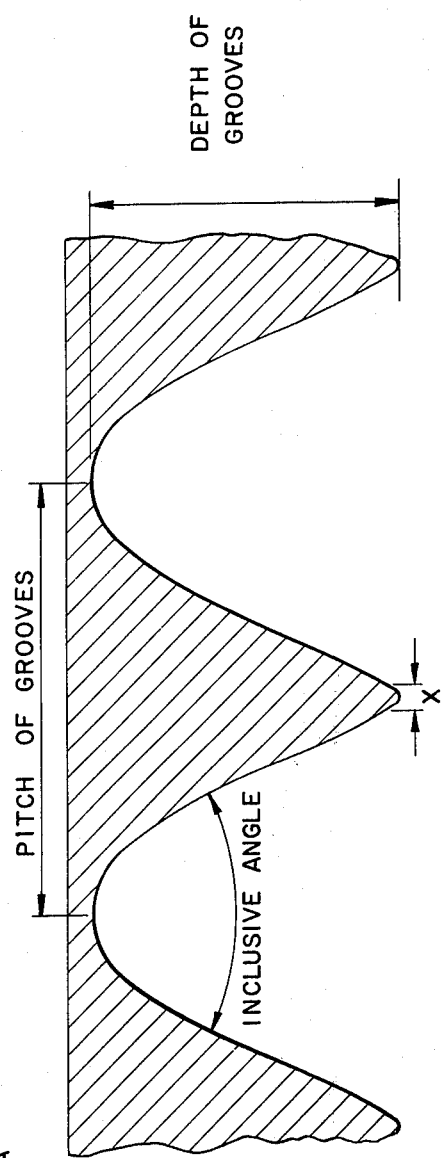
FIG. 2 illustrates the ridge profile of the ridged roller employed in the web-profiling unit of FIG. 1.
Figure 5:
FIG. 5 is a section through a portion of a profiled web.

FIG. 2 of the drawing shows on an enlarged scale the kind of ridge profile of roller 3 which can be employed in carrying out the present invention. As will be seen from FIG. 2, the characterizing features of the profile are the peaks, the trips of which are only slightly radiused, and secondly a dimension $x$ of the peaks which, while providing for adequate strength, results in the minimum "land" between adjacent "humps" of the grooved web 2', which land constitutes the precursor of the predetermined longitudinal path along which the grooved web will split during the subsequent fibrillation treatment. The thickness of the web 2' in this land portion can be of the order of, for example, up to 1/20 of that of the web before grooving, and the depth of the grooves in ridged roller 3 should be such that the material of the web flows into the troughs of the ridged roller 3 during the grooving operation. In general, the denier of the resulting fibers will be determined by the size of the humps of web 2' and the degree of drawdown which takes place during stretching; both can be varied within sufficiently wide limits to enable fibers of an adequately wide range of denier to be manufactured by the present process. The appearance of one example of a typical grooved web 2' is shown in section in FIG. 5.

Figure 3:
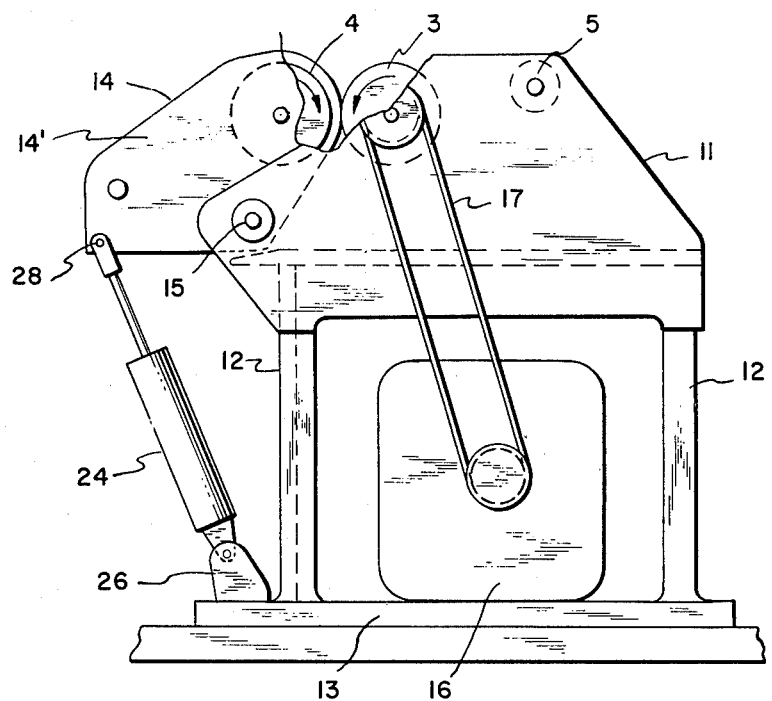
FIG. 3 is a side elevation of one form of web-profiling unit in accordance with the present invention.
Figure 4:
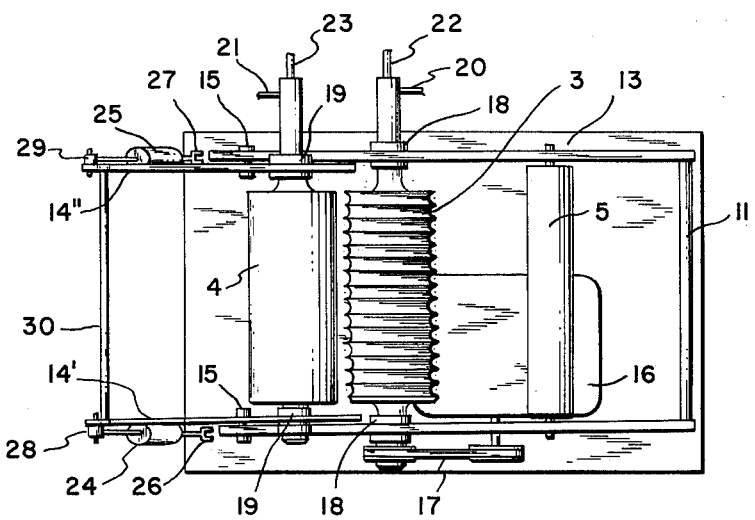
FIG. 4 is a plan view of the machine of FIG. 3.

Referring to FIGS. 3 and 4 of the accompanying drawing, the profiling unit consists of a machine comprising a main frame 11 carried on legs 12 upstanding from a base 13, and a subframe 14 pivotally mounted on main frame 11 at pivot points 15. Main frame 11 carries a steel, ridged roller 3 which is driven by an electric motor 16 through a belt drive 17, the roller 3 being mounted in roller bearings 18. Subframe 14 carries a steel backing roller 4 mounted in roller bearings 19. Both rollers 3 and 4 have provision for the circulation of a heat transfer medium therethrough, the heat transfer medium entering through inlets 20, 21 and leaving through outlets 22, 23. Movement of subframe 14 about its pivot points 15 is effected by two compressed air-operated jacking cylinders 24 and 25 which are pivotally anchored to base 13 at 26 and 27, respectively, and which are pivotally attached to subframe 14 at 28 and 29. Located above pivot points 28, 29 and spanning between the two side plates 14' and 14'' of subframe 14 is a torsion bar 30 which is fixed at one end to side plate 14'. The other end of the torsion bar projects with slight clearance through a hole in the other side plate 14'' to allow for minor differences in the rate of lift between jacking cylinders 24, 25. Side plates 14 and 14'' of subframe 14 are kept apart and in alignment by the backing roller 4. An idler roller 5 is provided in main frame 11 to assist in taking off the profiled web to the stretching stage.

In operation of the machine shown in FIGS. 3 and 4, jacking cylinders 24, 25 are operated to bring the backing roller 4 into the operative position in which it is slightly spaced from ridged roller 3 to an extent depending on the desired web thickness. A hot polymer web is then extruded downwardly into the nip between rollers 3 and 4, while roller 3 is rotated by motor 16. The frictional effect of the hot web passing through the nip causes roller 4 to turn in an opposite direction to roller 3. Air pressure is then applied to jacking cylinders 24, 25, for example, a pressure of 80°–90° psi (pounds per square inch) in the case of the machine used in the following specific example, to bias the backing roller 4 towards ridged roller 3 so that the hot web is brought into pressure contact with the ridges thereof and thereby impressed with the required profile.

The present invention is illustrated by the following example:

EXAMPLE

Polypropylene fibers of an average denier of 30 were made from commercial polypropylene of melt index 3.5 using machinery comprising a profiling unit as just described and conventional stretching equipment. The profiling unit comprised a driven solid steel roller 10 inches long and 4 inches in diameter which was provided with 240 parallel surface ridges extending over a 6 inch length of its surface. The ridges were made by precision grinding to a 40 TPI (threads per inch) Standard Whitworth form, the ridges having a pitch of 0.0125 inch, a depth of 0.0077 inch and an inclusive angle (see FIG. 11) of 55°. The ridged roller was provided with a shoulder on each side of its ridged area the shoulders standing just slightly higher than the ridges to provide a safeguard against accidental damage to the ridges as a result of contact with the backing roller.

A hot web of polypropylene 6.5 inches wide and 0.003 inch thick, was extruded from a two-inch screw extruder located above the profiling unit, the hot, extruded web falling vertically down into the nip between the ridged roller and the backing roller at a speed of 30 feet per minute. Cooling water was circulated through the ridged roll to maintain it at 15°C during operation, but the backing roller was allowed to run at a higher temperature, namely 90°C. The contact pressure exerted on the web as it passed between the roller was about 1,000 psi (as calculated on the basis of 80 psi air pressure in the jacking cylinders, each of which had a 3-inch diameter piston). The resulting profiled web leaving the rollers was passed to the first Godet set of the stretching unit. The latter was operated with a stretch ratio of 8:1 and at an oven (i.e. stretching) temperature of 145°C. The stretched web was taken off at a speed of 240 feet per minute. A complete breakdown into inidividual filaments occurred as a result of a controlled fibrillation of the web by the time it left the second Godet set. The resulting yarn was then reeled-up in the form of a 10,000 denier tow. The average denier of the fibers was 30.

The following additional data further define the operation just described:

| Extruder | |
| --- | --- |
| Screw | L/D - 22:1, compression ratio 31:1 |
| Temperatures along barrel, °C | 210/230/240/250/260 |
| Die temperatures, °C | 270 |
| Screw Speed | 13 rpm |
| Die width | 10 inch |
| Die lip separation | 0.015 inch |
| Physical Properties of Product | |
| Tensile properties measured on the 10,000 denier tow | |
| Tenacity | 5.1 g/denier |
| Elongation at break | 21% |
| Tensile properties of individual fibers: | |
| Tenacity | approx 6g/denier |
| Elongation at break | 19% |

In a modification of the process just described, the stretched web is reeled-up and then fed, in a separate operation, to a sisal type, heavy duty twisting machine operated at about 100 feet per minute in which it is twisted into a yarn.

The process of the present invention has the advantages of simplicity and reliability in operation, and it provides for accurate profiling and in consequence little or no variation in denier between the individual fibers produced. In general, and assuming substantially constant web dimensions which can readily be achieved, individual fibers produced in accordance with the present invention exhibit little or no variation in denier over their lengths and no significant variation in denier is found between the various fibers formed from a common web. Moreover, as a result of the controlled fibrillation which occurs during their formation, such fibers may be manufactured in a form in which they are substantially free from appendant fibrils.

The fibers and yarns manufactured in accordance with the present invention find application in many textile uses, for example, in the domestic textile field including upholstery, curtaining, carpets and safety belts, and in the rope and cordage industry. The size and cross-section of the fibers manufactured in accordance with the invention may be selected according to end-use requirements. As previously indicated FIG. 4 shows the appearance of one form of grooved web made by the present process, but in practice the cross-section thereof may be varied depending on the web thickness before profiling and to a lesser extent, on the profiling pressure. The thickness of the grooved web between the humps is advantageously as small as possible, but in general the ratio of the thickness of the grooved web between the humps to the web thickness before profiling may be up to about 1:20.

What we claim is:

1. A web-profiling unit suitable for use in the manufacture of synthetic fibers which comprises a ridged roller having a plurality of closely-spaced, parallel, surface ridges each having inwardly directed sides leading to a peak which is slightly radiused, the sides of adjacent ridges forming troughs, the profile of the ridges being such that the pitch of the ridges is within the range 0.003 to 0.05 inches and the depth of the troughs between adjacent ridges is within the range 0.002 to 0.02 inches mounted in a fixed frame and adapted to be rotationally driven and a plain roller mounted in a movable frame which is pivotally attached to said fixed frame for movement with respect thereto by the biasing means, said movable frame being formed from two opposed side members each carrying a bearing for one end of said plain roller, and a pair of piston and cylinder mechanisms acting respectively on said side members, said side members being connected by a torsion bar fixed to one side member but fitting with clearance in a hole in the other side member, said rollers having non-yielding surfaces.

* * * * *